United States Patent
S et al.

(10) Patent No.: US 12,425,194 B2
(45) Date of Patent: Sep. 23, 2025

(54) CRYPTOGRAPHIC BRIDGE FOR SECURING PUBLIC KEY INFRASTRUCTURE (PKI)

(71) Applicant: Bank of America Corporation, Charlotte, NC (US)

(72) Inventors: Rajamuthuraman S, Chennai (IN); Chennamsetty Lakshmi Naresh, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 286 days.

(21) Appl. No.: 17/974,655

(22) Filed: Oct. 27, 2022

(65) Prior Publication Data

US 2024/0146511 A1 May 2, 2024

(51) Int. Cl.
*H04L 9/00* (2022.01)
*H04L 9/08* (2006.01)
*H04L 9/32* (2006.01)

(52) U.S. Cl.
CPC ............ *H04L 9/0825* (2013.01); *H04L 9/006* (2013.01); *H04L 9/3213* (2013.01); *H04L 9/3247* (2013.01)

(58) Field of Classification Search
CPC ..... H04L 9/0825; H04L 9/006; H04L 9/3213; H04L 9/3247; H04L 9/3263; H04L 9/3268
USPC ......................................................... 713/156
See application file for complete search history.

(56) References Cited

U.S. PATENT DOCUMENTS

| 11,246,032 B1* | 2/2022 | Maass .................... H04W 12/71 |
| 2013/0268755 A1* | 10/2013 | Simmons ................ G06F 21/10 |
| | | 713/156 |
| 2022/0141220 A1* | 5/2022 | Lind .................... H04L 63/0838 |
| | | 726/1 |

OTHER PUBLICATIONS

Provisioning, Authentication and Secure Communications for IoT Devices on FIWARE, Sousa et al, Sep. 2021 (Year: 2021).*

* cited by examiner

*Primary Examiner* — Jahangir Kabir
(74) *Attorney, Agent, or Firm* — Weiss & Arons LLP

(57) ABSTRACT

Systems, methods, and apparatus are provided for customizing PKI with a secure interface layer that limits digital certificate access. The secure microservice interface may receive a call from an authorized application for digital signature of an identification token. An API may obtain an application-specific private key from a digital certificate management system and encrypt the private key for the application. The secure microservice interface may receive a call from a central server for decryption of the digitally signed identification token. An API may obtain an application-specific public key from the digital certificate management system and convert the public key to a format compatible with the identification token for the central server. The secure microservice interface may renew the digital certificate with the relevant certification authority on a periodic basis.

14 Claims, 6 Drawing Sheets

CRYPTOGRAPHIC BRIDGE FOR SECURING PUBLIC KEY INFRASTRUCTURE (PKI)

FIELD OF TECHNOLOGY

Aspects of the disclosure relate to digital public and private key encryption.

BACKGROUND OF THE DISCLOSURE

In conventional PKI architecture, an application may secure a digital certificate that includes private and public key encryption components. The application may provision an authorization server with the public key. The application may generate an identification token that is digitally signed with private key encryption. The identification token may be decrypted by the authorization server using the public key.

This framework requires maintaining a digital certificate at various levels within the enterprise, thereby exposing the enterprise to ongoing operational risk. Additionally, certificate management and maintenance may require applications to update certificates on a periodic basis and reprovision the authorization with a new public key each time.

It would be desirable to modify an existing PKI solution to manage cryptographic keys on an enterprise level. Such centralized infrastructure would both improve security and reduce management requirements for thousands of enterprise applications.

SUMMARY OF THE DISCLOSURE

Systems, methods, and apparatus are provided for customizing PKI with a secure interface layer that limits digital certificate access.

A secure microservice interface may receive a call from an authorized application for digital signature of an identification token. An API may obtain an application-specific private key from a digital certificate management system and encrypt the private key for the application.

The secure microservice interface may receive a call from a central server for decryption of the digitally signed identification token. An API may obtain an application-specific public key from the digital certificate management system and convert the public key to a format compatible with the identification token for the central server.

The secure microservice interface may renew the digital certificate with the relevant certification authority on a periodic basis.

The secure microservice architecture is a practical application that improves system security and processing efficiency. The custom interface layer eliminates local storage of a digital certificate, private key, and public key at the application level and improves access level security. The custom interface layer also eliminates the need to provision the central server with public keys and reprovision the server following each certificate update. The custom interface layer also eliminates the need for applications to manage the multiple public key formats that may be required by the authorization server.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
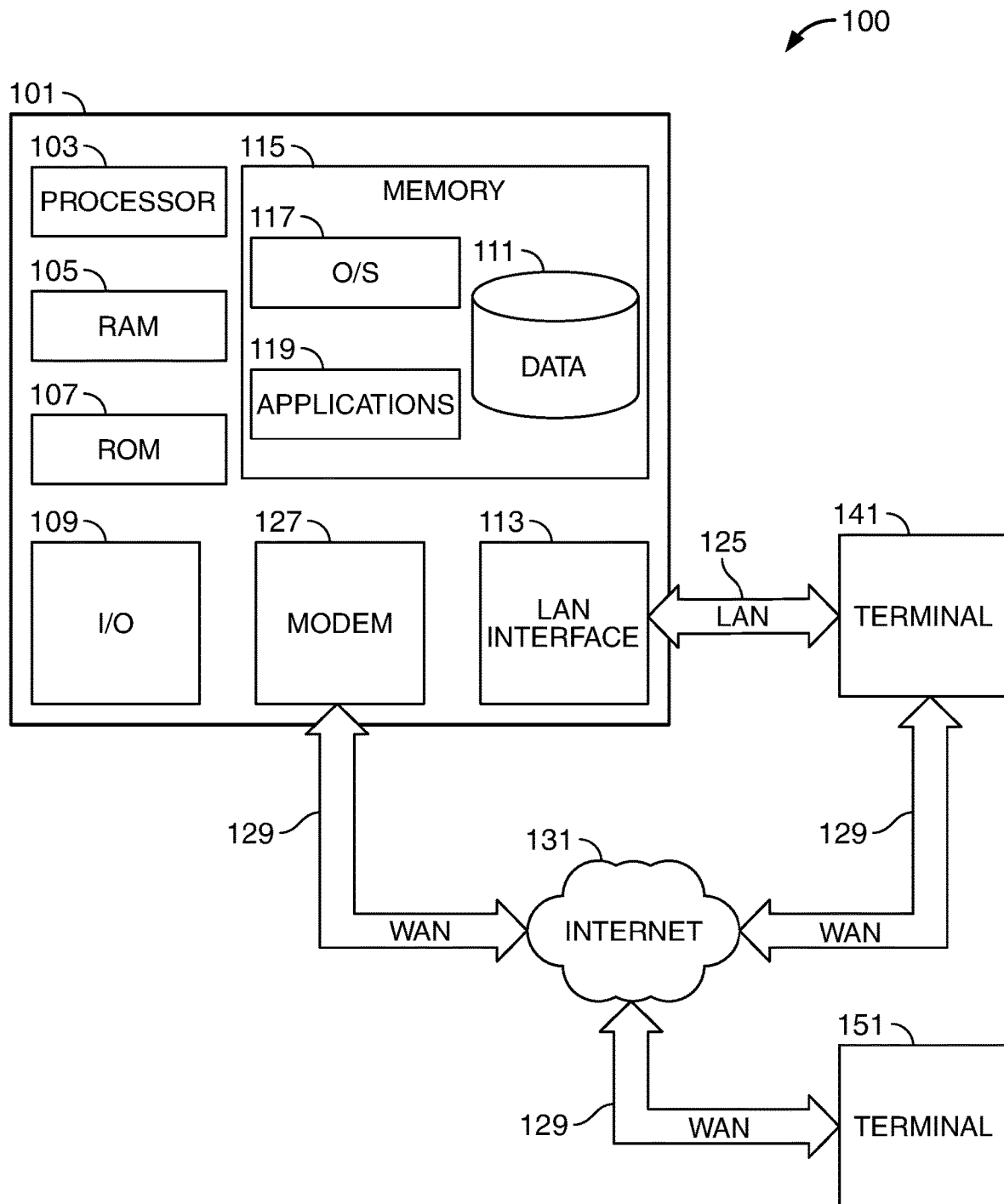
FIG. 1 shows illustrative apparatus in accordance with principles of the disclosure.

Systems, methods, and apparatus are provided for customizing PKI with a secure interface layer.

For the sake of illustration, the invention will be described as being performed by a "system." The system may include one or more features of apparatus and methods that are described herein and/or any other suitable device or approach.

Public Key Infrastructure (PKI) is primarily used for encrypting and signing data. PKI is based on digital certificates which function as virtual identification cards. PKI assigns an application a pair of keys. The keys may be generated by running a mathematical process against a digital certificate for the application.

Conventionally, a client application may maintain its own private and public keys. The application may use the private key to digitally sign data and may provide the public key to other system components, such as an authorization server, for decryption.

This framework requires maintaining the cryptographic certificate at various levels within the enterprise, exposing the enterprise to ongoing operational risk. Local storage of certificates at each application multiplies the risk of exposure. Additionally, certificate management and maintenance protocols require applications to update certificates on a periodic basis and reprovision the authorization server with a new public key each time.

It would be desirable to create a custom integrated layer within a deployed PKI solution that would restrict maintenance of cryptographic keys to the enterprise level. Such centralized infrastructure would improve both security and processing efficiency.

The system may include one or more enterprise applications. A user may access an application with user credentials. The application may generate a token. The token may be an identification token that includes a set of claims about the user such as name and email.

The token may be a JavaScript Object Notation (JSON) Web Token (JWT). A JWT is a standardized access token that enables two parties to securely exchange data. JWTs are designed to be compact and usable for SSO operations. A JWT contains all the necessary information about an entity so that multiple database queries are not required.

JWTs are regularly used in authentication protocols because their short messages can be encrypted to securely convey whether a sender has the necessary access rights. Users only come into indirect contact with the token, while the actual communication takes places between the client and the server.

JWT may rely on other JSON-based standards including JSON Web Signature (JWS) and JSON Web Encryption (JWE). A signed JWT consists of three parts, a header, payload, and signature. The signature structure of a JWT is determined by JWS. The digital signature may be created using the Base64 coding of the header and payload and the indicated signing algorithm.

Private key signature verifies that data is not altered and comes from the correct sender. The signature may be decrypted using the corresponding public key. In some embodiments, the system may use JWE standards to encrypt the content of the payload and then digitally sign the token. The corresponding public key may be used to decrypt the content.

The system may include an enterprise certificate manager. The certificate manager may be part of a back-end certificate management system. The certificate manager may store a digital certificate. A signed digital certificate is a method of verifying the authenticity of an entity, such as a server, a client, or an application. To ensure maximum security, the certificate may be provided a trusted third-party certificate authority.

The digital certificate may be associated with a key pair. The key pair may include a public key and private key. Key pairs may be generated with cryptographic algorithms, one-way functions, or by any suitable method. In some embodiments, the certificate authority may provide the public and private keys. In some embodiments, the system may generate the keys by applying cryptographic algorithms to the digital certificate.

The system may include a central authorization server. The authorization server may receive an identification token from an application. The identification token may be a JWT or any suitable token.

The authorization server may authenticate the digital signature. The authorization server may use a public key associated with the application to authenticate the digital signature. The authorization server may use the public key to decrypt the JWT. The public key may be in JSON Web Key (JWK) format, or in any suitable format.

The authorization server may validate the digital signature. The authorization server may communicate with a directory server to validate user credentials. The authorization server may generate an access token and transmit the token to the client. The access token may enable the user to access application resources.

The system may include a custom interface layer. The interface layer may be integrated at the enterprise level. The interface layer may interact with a client application. The interface layer may interact with a central server. The interface layer may interact with an enterprise digital certificate manager. The interface layer may interact with a third-party certificate authority.

The interface layer may be a microservice unit. Microservices are a software architecture composed of small independent services that communicate over well-defined APIs. The custom layer may be built as independent components that run each process as a service. In some embodiments, a microservice orchestrator may coordinate the different microservices within the unit.

An application programming interface (API) enables computers to communicate with each other. The API functions as a software interface, offering a service to other pieces of software. A standardized API includes different parts which act as tools or services that are available to the programmer. A program using one of these parts may call that portion of the API. API calls may also be referred to as subroutines, methods, requests, or endpoints.

The interface layer may include secure microservice APIs. The interface layer may include a secure API that connects to the enterprise certificate management system. The back-end certificate management system may serve as a centralized repository for application public and private keys. The API may receive a call from an application. The API may verify the application credentials.

The API may access the application digital certificate and encrypt the private key for the application. The API may transmit the encrypted private key to the application for signature of an identification token or for any suitable purpose. The application may not have direct access to the digital certificate or the private key. These protocols improve security by eliminating local storage of the digital certificate, the public key, and the private key at the application level.

A secure API may receive a call from a central server. The API may connect to the enterprise certificate management system. The API may obtain and format a public key for an authorization server. The API may transmit the formatted public key to the authorization server for decryption of the signed identification token or for any suitable purpose. These protocols improve system efficiency by eliminating the need for each application to provision the central server with a public key for decryption. Applications also avoid the need to manage multiple public key formats required by the central server.

A secure API may connect to a third-party to update a digital certificate. These protocols improve efficiency by eliminating the need for each application to renew its certificate and reprovision the central server.

One or more non-transitory computer-readable media storing computer-executable instructions are provided. When executed by a processor on a computer system, the instructions perform a method for protecting public key infrastructure using a secure microservice API layer that limits digital certificate access.

The method may include at a microservice unit, receiving a call from an authorized application for digital signature of an identification token. A microservice API may obtain an application-specific private key from a digital certificate management system and encrypt the private key for the application.

The method may include, at the microservice unit, receiving a call from a central server for decryption of the digitally signed identification token. A microservice API may obtain an application-specific public key from the digital certificate management system. The microservice API may convert the public key to a format compatible with the identification token for the central server.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates computing device 101 (alternatively referred to herein as a "server or computer") that may be used in accordance with the principles of the invention. Server 101 may interact with DNA computing apparatus including a DNA processor and/or DNA storage.

Computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, perform power management routines or other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
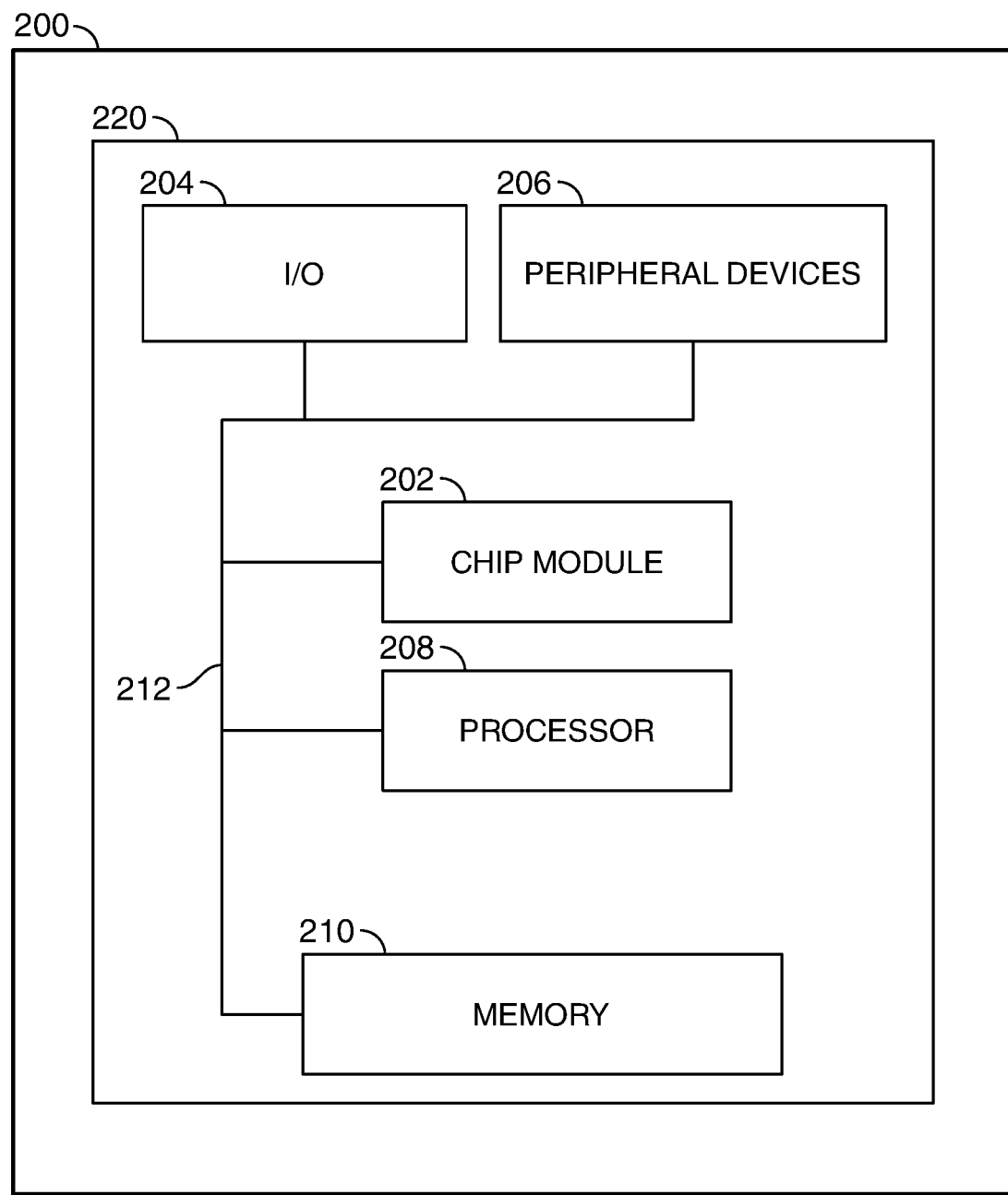
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208; and machine-readable memory 210.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
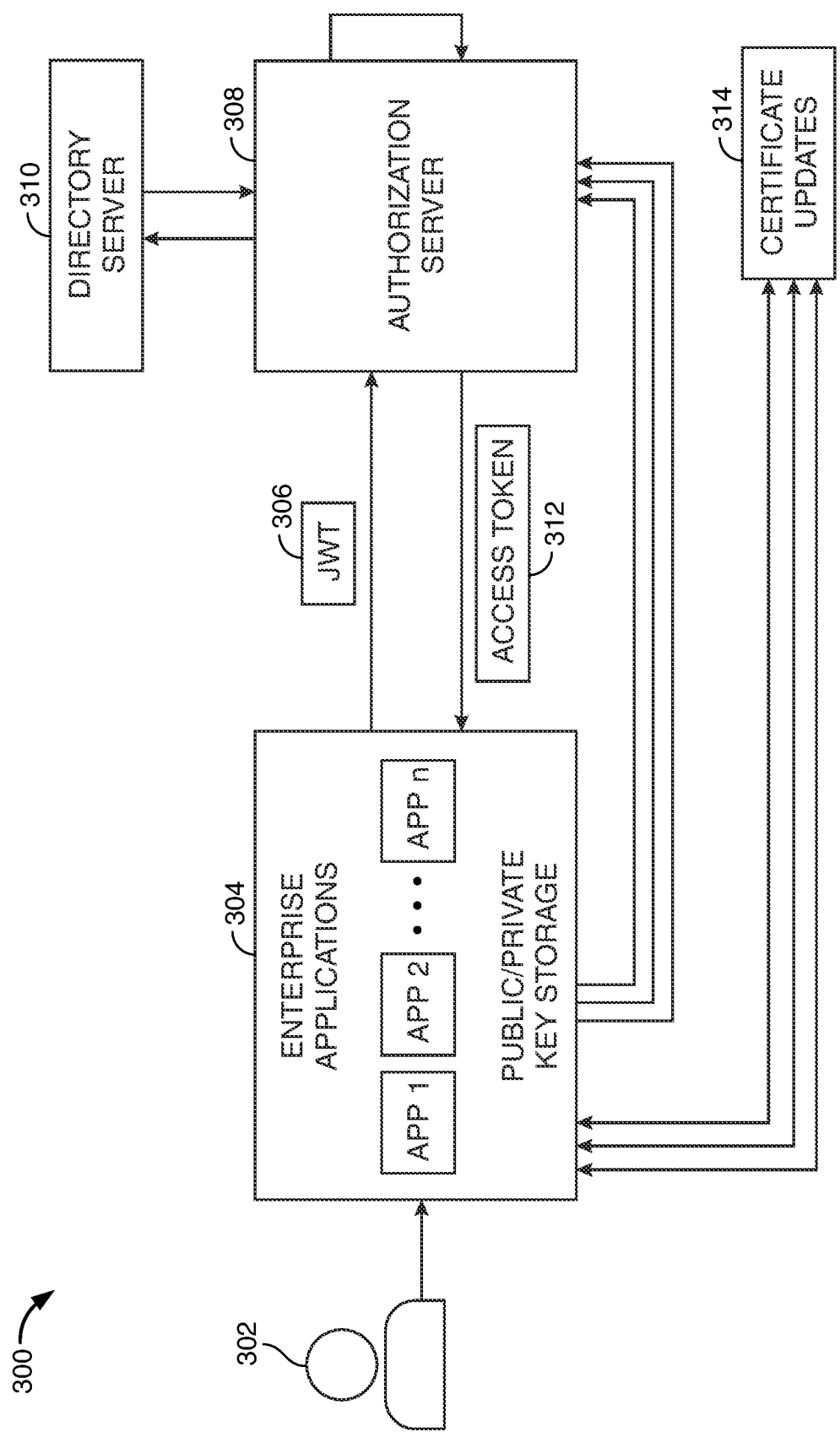
FIG. 3 shows a prior art process flow.

FIG. 3 shows prior art process flow 300 for authentication using public and private keys. One of applications 304 may receive credentials from user 302.

Conventionally, key pairs are maintained by each enterprise application. Applications 304 may use the private key to digitally sign an identity token such as JWT 306. Applications 304 may provision authorization server 308 with the corresponding public key to decrypt the JWT. Applications 304 may be required to contact certificate authorities for periodic certificate updates 314. Applications 304 reprovision authorization server 308 with public keys following each update.

Figure 4:
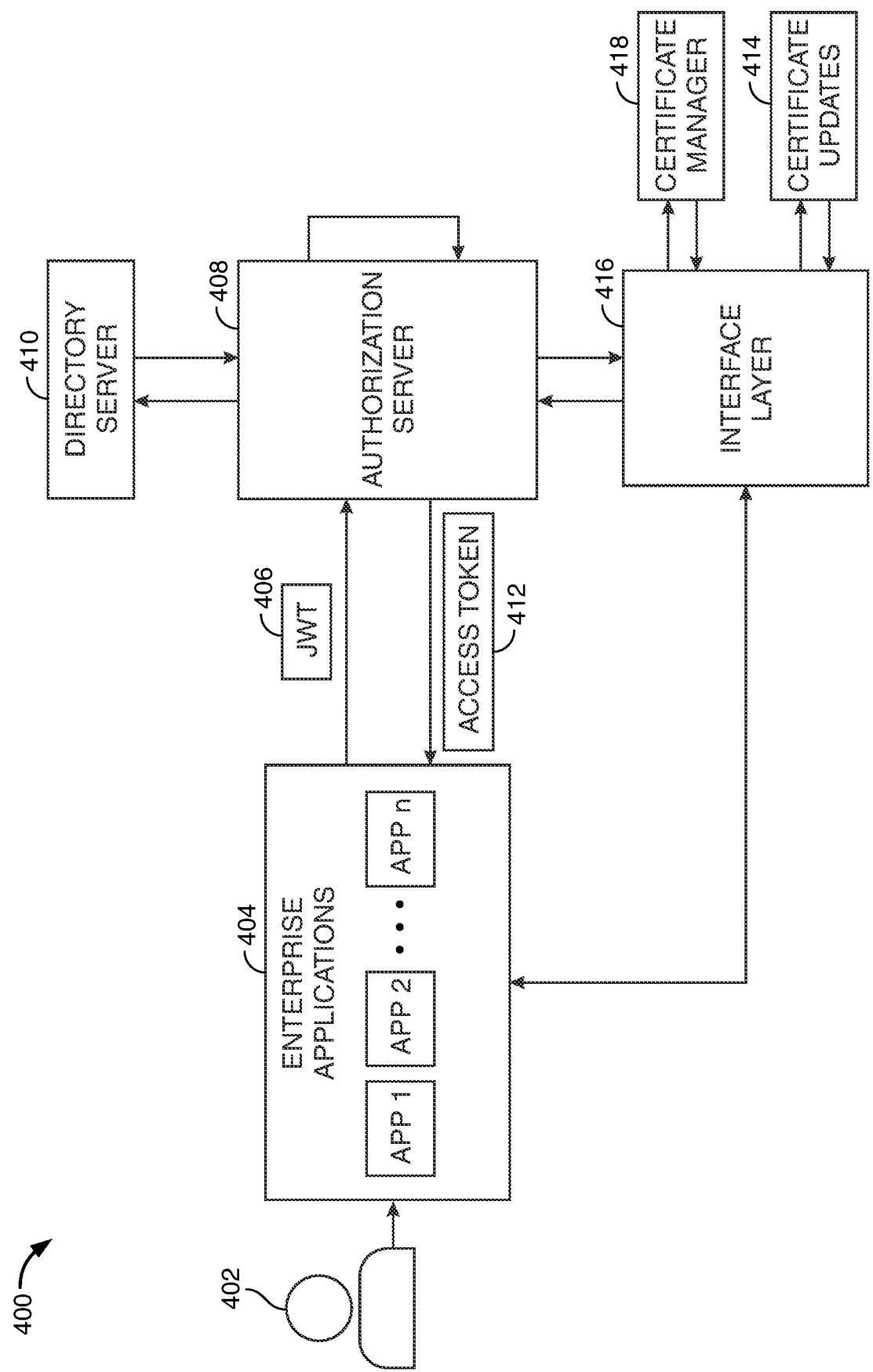
FIG. 4 shows an illustrative process flow in accordance with principles of the disclosure.

FIG. 4 shows illustrative process flow 400 for authentication using public and private keys. Elements of process flow 400 may correspond to elements of process flow 300, shown in FIG. 3.

User 402 may enter credentials for one of enterprise applications 404. Application 404 may generate identification token 406. Identification token 406 is a JWT, but any suitable identification token standard may be used.

Application 404 may use a private key to digitally sign the JWT. Application 404 may call interface layer 416. Interface layer 416 may access a digital certificate associated with the application at certificate manager 418. Interface layer 416 may obtain and encrypt the private key for application 404.

Identification token 406 may be received at authorization server 408. Authorization server 408 may verify user identity at directory server 410. Authorization server 408 may use a public key to decrypt the digital signature for identification token 406. Authorization server 408 may call interface layer 416. Interface layer 416 may access the digital certificate associated with the application at certificate manager 418. Interface layer 416 may format the public key for application 404 based on the requirements of the central server.

In response to authentication of the digitally signed identification token, authorization server may transmit access token 412 to application 404.

Interface layer 416 may periodically manage certificate updates 414.

Figure 5A:
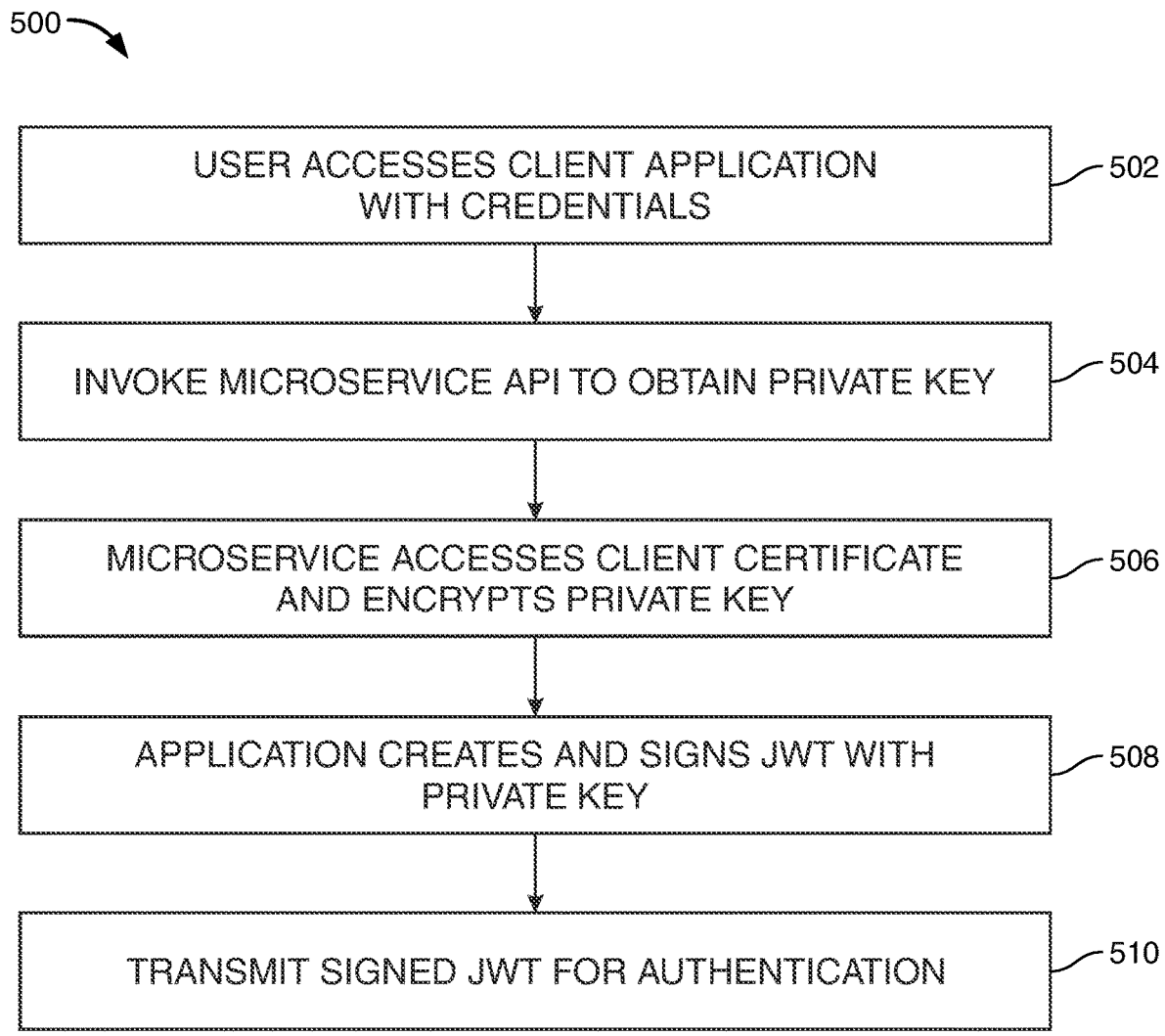
FIG. 5A shows a first portion of an illustrative process flow in accordance with principles of the disclosure.
Figure 5B:
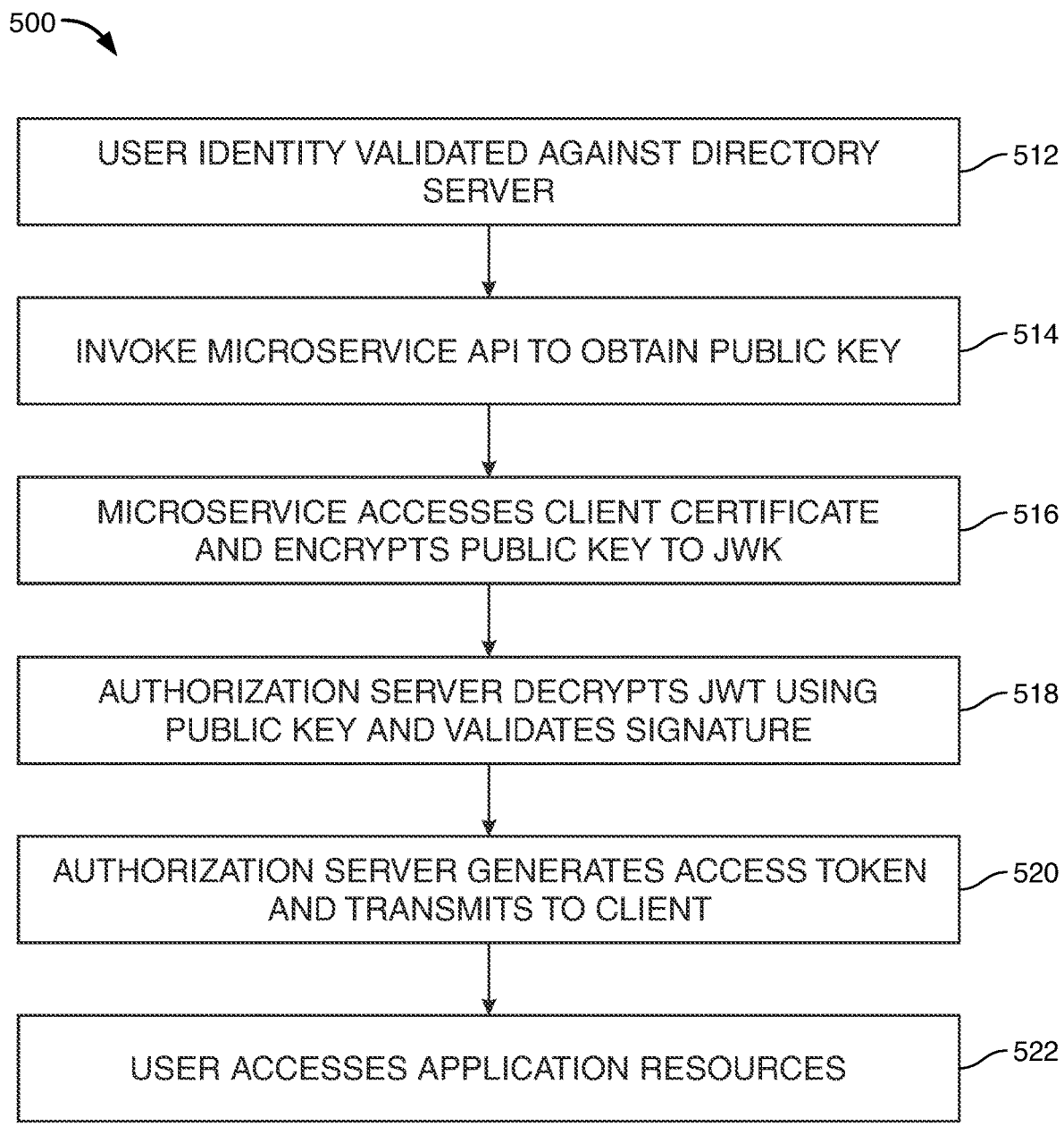
FIG. 5B shows a second portion of an illustrative process flow in accordance with principles of the disclosure.

FIGS. 5A and 5B show illustrative process flow 500 for authentication using public and private keys.

FIG. 5A includes interactions between a client application and secure microservice API architecture. At step 502, a user may access a client application with their credentials. At step 504, the application may call a microservice API to obtain a private key. At step 506, the microservice API accesses the client certificate and encrypts a private key for the application. At step 508, the application creates and signs an identification token such as a JWT with the private key. At step 510, the digitally signed JWT is transmitted for user authentication.

FIG. 5B includes interactions between a central server and the secure microservice API architecture. At step 512, user credentials are validated against a directory server. At step 514, an authorization server may call a microservice API to obtain a public key. At step 516, the microservice accesses the client certificate and formats the public key based on the identification token format. At step 518, the authorization server decrypts and validates the digital signature. At step 520, the authorization server generates an access token and transmits it to the client. At step 522, the user may access application resources.

Thus, methods and apparatus for a CRYPTOGRAPHIC BRIDGE FOR SECURING PUBLIC KEY INFRASTRUCTURE (PKI) are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for securing public key infrastructure with a custom microservice bridge that restricts client device access to a digital certificate, the system comprising:

a client device comprising a microprocessor executing a client application, the application configured to generate and digitally sign an identification token;

a central server configured generate an access token in response to authentication of the identification token; an interface layer comprising a secure microservice bridge remote from the client device, the microservice bridge comprising a microservice orchestrator and a set of APIs that interact with the client device, the central server, and an enterprise digital certificate manager, the interface layer configured to:

in response to a call from the application, access an application-specific digital certificate stored by the enterprise digital certificate manager and generate an application-specific private key;

encrypt the application-specific private key for digital signature at the client application; in response to a call from the central server, access the application-specific digital certificate stored by the enterprise digital certificate manager and generate an application-specific public key; and format the application-specific public key in a format compatible with the identification token for decrypting the digital signature at the central server;

wherein the client device is restricted from having access to the digital certificate, the private key, and the public key.

2. The system of claim 1, the interface layer further configured to renew the digital certificate on a periodic basis.

3. The system of claim 1, the interface layer comprising one or more secure APIs.

4. The system of claim 1, the interface layer architecture comprising one or more microservice units.

5. The system of claim 1, the identification token comprising a JSON web token (JWT) and the public key comprising a JSON web key (JWK).

6. One or more non-transitory computer-readable media storing computer-executable instructions which, when executed by a processor on a computer system, perform a method for protecting public key infrastructure using a secure microservice bridge remote from a client device and comprising a set of APIs that limits digital certificate access by a client device, the method comprising, at the secure microservice bridge:

receiving a call from an authorized application at the client device for digital signature of an identification token;

obtaining an application-specific private key from a digital certificate management system;

encrypting the private key for the application;

receiving a call from a central server for decryption of the digitally signed identification token;

obtaining an application-specific public key from the digital certificate management system; and converting the public key to a format compatible with the identification token for the central server;

wherein the client device is restricted from having access to the digital certificate, the private key and the public key.

7. The media of claim 6, the method further comprising, at the secure microservice bridge, using an API from the set of APIs, renewing the digital certificate on a periodic basis.

8. The media of claim 6, the identification token comprising a JSON web token (JWT) and the public key comprising a JSON web key (JWK).

9. A method for protecting public key infrastructure using a secure microservice bridge comprising an API interface remote from a client device that eliminates maintenance of digital certificates, public keys, and private keys at the application level, the method comprising:
    at the client device, at a client application, at a client device:
        receiving user credentials;
        generating a JSON web token (JWT);
        digitally signing the JWT using an encrypted application-specific private key;
    at a central server:
        receiving the JWT;
        decrypting the JWT using a JSON web key (JWK);
        in response to authenticating the JWT, transmitting an access token to the client application;
    at the secure microservice bridge comprising the API interface:
        receiving a call from the client application;
        obtaining an application-specific private key from a digital certificate management system;
        encrypting an application-specific private key for the application for digital signature of the JWT;
        receiving a call from a central server for decryption of the digitally signed JWT;
        obtaining an application-specific public key from the digital certificate management system; and
        converting the public key to a JWK for the central server for decryption of the JWT;
    wherein the client device is restricted from having access to the digital certificate, the private key, and the public key.

10. The method of claim 9, wherein the application does not have direct access to the digital certificate management system.

11. The method of claim 9, wherein the digital certificate and the public key are not stored at the central server.

12. The method of claim 11, wherein the central server does not have direct access to the digital certificate management system.

13. The method of claim 9, further comprising, at the secure API interface, automatically renewing the digital certificate on a periodic basis.

14. The method of claim 9, wherein interface architecture comprises one or more microservice units.

* * * * *